US011115949B1

(12) United States Patent
Rath

(10) Patent No.: US 11,115,949 B1
(45) Date of Patent: Sep. 7, 2021

(54) REGISTERING USER EQUIPMENT WITH A CIRCUIT-SWITCHED DOMAIN

(71) Applicant: T-Mobile USA, Inc., Bellevue, WA (US)

(72) Inventor: Asit Kumar Rath, Redmond, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 17/000,060

(22) Filed: Aug. 21, 2020

(51) Int. Cl.
*H04W 60/00* (2009.01)
*H04L 29/08* (2006.01)
*H04W 8/04* (2009.01)

(52) U.S. Cl.
CPC ............. *H04W 60/00* (2013.01); *H04L 67/26* (2013.01); *H04W 8/04* (2013.01)

(58) Field of Classification Search
CPC .......... H04W 60/00; H04W 8/04; H04L 67/26
See application file for complete search history.

(56) References Cited

U.S. PATENT DOCUMENTS

| 9,503,484 | B2 | 11/2016 | Zisimopoulos et al. |
| 2010/0329243 | A1 | 12/2010 | Buckley et al. |
| 2016/0095020 | A1* | 3/2016 | Balakrishnan .... H04W 36/0022 370/331 |
| 2018/0242377 | A1* | 8/2018 | Basrur ................. H04W 76/10 |
| 2021/0105670 | A1* | 4/2021 | Chiang ................ H04W 48/18 |
| 2021/0160666 | A1* | 5/2021 | Zaifuddin ............. H04W 8/04 |

* cited by examiner

*Primary Examiner* — Brandon J Miller
(74) *Attorney, Agent, or Firm* — Lane Powell PC

(57) ABSTRACT

A system and method for registering a user equipment (UE) to a circuit-switching (CS) domain only is discussed herein. An application server (AS) generates a subscribe-notifications-request (SNR) and transmits the SNR to a node of a network, such as a home subscriber server, to request a change in user data when a user equipment (UE) registers only with the CS domain after reconnection to the network. The SNR includes an attribute value pair (AVP) to generate a notification that the UE is registered with the CS domain without requiring initial registration with a packet-switched (PS) domain. The HSS, which receives notification of registration of the UE to the CS domain from a home location register (HLR) a mobile switching center/visitor location register (MSC/VLR), generates a push-notification-request (PNR) to notify the AS of the change in user data.

20 Claims, 2 Drawing Sheets

REGISTERING USER EQUIPMENT WITH A CIRCUIT-SWITCHED DOMAIN

BACKGROUND

An application server of a telecommunications network can query a domain, whether packet-switched or circuit-switched, to determine the domain to which a user equipment is registered. By identifying the registered domain, the application server can determine the services available to the user equipment. For example, the packet-switched (PS) domain provides for data or voice services, whereas the circuit-switched (CS) domain provides for voice or legacy messages.

When a user equipment (UE) that is disconnected from a telecommunications network reconnects to the telecommunications network, the UE registers with the CS domain, the PS domain, or both the PS and CS domains. Upon reconnection, an application server providing one or more services is only notified when the UE is re-registered to at least the PS domain. When the UE re-registers with the PS domain or the PS and CS domains, the data-related services made available by PS domain registration are prioritized. However, in certain circumstances, the UE may not be able to re-register to the PS domain. Therefore, non-data-related services may be available, but an application server may not be aware that a re-registered UE is available to receive non-data-related services.

What is needed is a telecommunication network to more efficiently register UEs to a domain.

DETAILED DESCRIPTION

Figure 1:
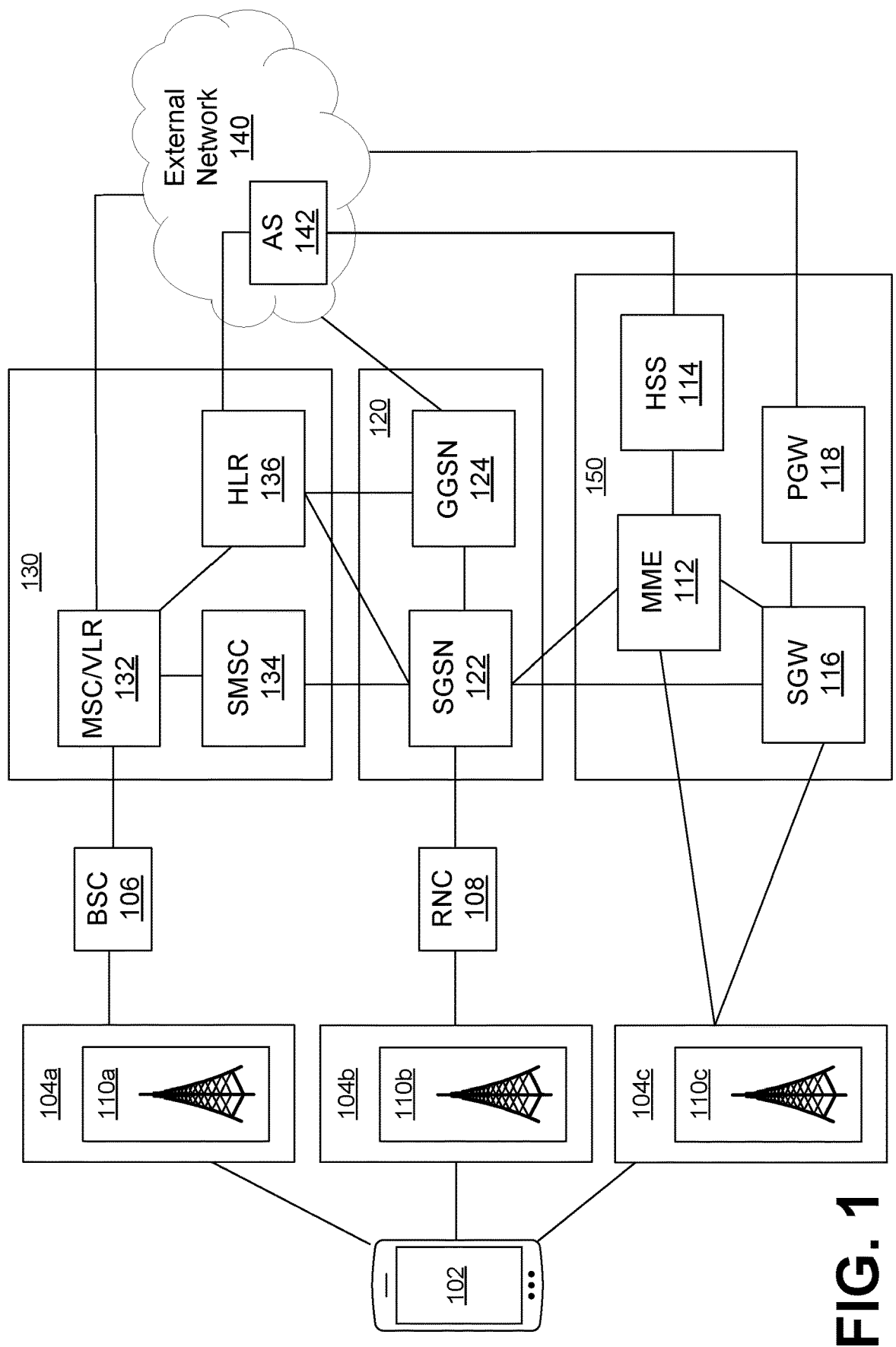
FIG. 1 illustrates an example network.

A system and method for registering a user equipment (UE) to a circuit-switching (CS) domain only is discussed herein. A telecommunications network includes two domains: a packet-switched domain and a circuit-switched domain. The UE can be unregistered to both domains (i.e., the UE is powered off, disconnected from the telecommunications network, or the like), registered to one domain, or registered to both domains. An application server, which is a component of the telecommunications network, provides services to the UE. The application server can determine the services available to the user equipment based on the domain to which the UE is registered. For example, the packet-switched domain provides for data or voice services, whereas the circuit-switched domain provides for voice or legacy messages. In some instances, the CS domain is the only domain available because of the geographic location or available services or network sites of the telecommunications network. Therefore, voice services and legacy messaging services are available when the UE is registered only to the CS domain.

The UE has been initially disconnected from the telecommunications network due to the UE having been powered off, the UE having been disconnected from a network, or the like. Upon reconnection to the network, the CS domain may be the only domain available for re-registration because of the geographic location or available services or network sites of the telecommunications network. An application server (AS), which provides services to the UE, may require packet-based communication or data transfer, thereby requiring registration of the UE to the PS domain. However, another AS may provide services (e.g., voice, legacy messaging, or both) based on re-registration to only the CS domain. To provide the services, the AS needs to be notified that the UE is registered to the CS domain only. When the UE re-registers with the PS domain only or both the CS and PS domains, the data-related services available via the PS domain take priority.

To be notified that the UE is re-registered to the CS domain only, the AS generates a subscribe-notifications-request (SNR) and transmits the SNR to a node of a telecommunications network, such as a home subscriber server, to request a change in user data when the UE re-registers only with the CS domain after the UE disconnects from the telecommunications network (i.e., the UE is no longer connected to either the PS-domain or the CS-domain). The SNR includes an attribute value pair (AVP) to generate a notification that the UE re-registers with the CS domain without wither-registering with the PS domain (e.g., SMSRegistrationInfo AVP is "IP-SM-GW" or "Short Message Service Center" address). The HSS, which receives notification of registration of the UE to the CS domain from a home location register (HLR) or a mobile switching center/visitor location register (MSC/VLR), generates a push-notification-request (PNR) to notify the AS of the change in user data.

FIG. 1 shows a system including a telecommunications network 100. The telecommunications network 100 includes an access network (e.g., GERAN; UTRAN; E-UTRAN; VoLTE; 5G NR; VoNR) 104a-c which includes a network site (e.g., BTS, NodeB, eNodeB, or gNB) 110a-110c. The access network 104a-c connects a user equipment (UE) 102 to a mobile communication technology (e.g., 1G to 5G). The UE 102 can be connected to one or more access networks 104a-c simultaneously.

The UE 102 is any device used by an end-user for communication or data transmission purposes, including, without limitation, a mobile phone, a smartphone, a tablet, a personal digital assistant, a laptop with mobile connectivity, or the like.

When the access network 104c is E-UTRAN, the network site 110c is an eNodeB. The access network 104c transmits data, including data packets, between the UE 102 and an external network 140, such as through a data core 150. The network site 110c controls the UE 102 within a given cell of the telecommunications network. For example, the network site 110c sends and receives radio transmission(s) to the UE 102 using analogue and digital signal processing functions of an access network air interface. The network site 110c also controls low-level operations of the UE 102 via signaling messages, such as handover commands.

The network site 110c includes a UE communication module programmed to communicate with the UE 102 (i.e., transmit a signal or data). The UE communication module can be an interface, such as a UU or e-Uu interface. The network site 110c also includes a data core communication module programmed to communicate (i.e., transmit a signal or data) with the data core 150. The data core communication module can be an interface, such as a S1, GTP, or NG interface.

The data core 150 is an IP-based core network infrastructure that provides packet data services, such as to support the convergence of licensed and unlicensed radio technologies (e.g., an evolved packet core (EPC) or 5G Core). The data core 150 can be defined around various paradigms, including mobility, policy management, and security. The four elements of the data core include a home subscriber server (HSS) 114, a mobility management entity (MME) 112, a serving gateway (SGW) 116, and a packet data network gateway (PGW) 118.

The MME 112 pages and authenticates the UE 102. The MME 112 can retain location information at the tracker level for each UE 102 and selects the appropriate gateway during the initial registration process. The MME 112 can connect to the network site via a S1-MME interface and to the SGW 116 via a S11 interface.

The SGW 116 forwards and routes packets (e.g., data packets) to and from the network site and the PGW 118. The SGW 116 connects to the network site via a S1-U and to the PGW 118 via a S5/S8 interface.

The PGW 118 provides connectivity between the UE 102 and the external network 140, including a public data network, an IP multimedia subsystem (IMS) core, the like, or combinations or multiples thereof. The PGW 118 can be connected to the external network 140 via a SGi interface.

The HSS 114 of the data core 150, which is in communication with the MME 112 via a S6 interface, is a database that contains user-related information and subscriber-related information. Though the HSS 114 is discussed as being a node of the data core 150, the HSS 114 can be a node of the external network 140 or a first HSS can be a node of the data core 150 and a second HSS can be a node of the external network 140.

The external network 140 can include an application server (AS) 142. The AS 142 is a node that executes services (e.g., call forwarding) and fetches customer data (e.g., customer status, location information, or the like). The AS 142 can communicate with the HSS 114 and the HLR 136 via a Sh interface or MAP interface.

When the access network 104a is GERAN, the network site 110a is a base transceiver station (BTS) which is controlled by a base station controller (BSC) 106. The BTS includes equipment to transmit and receive radio signals, antennas, and equipment to encrypt and decrypt communications with the BSC 106. The BSC 106 can control multiple BTSs. The BSC 106 controls BTS handover, radio channel allocation, and UE measurements. The BTS and the BSC 106 are in communication via an Abis interface.

The BSC 106 communicates with a mobile switching center/visitor location register (MSC/VLR) 132 of a circuit-switched (CS) domain 130 via an A interface. The MSC/VLR 132 routes voice calls, text messages (i.e., short message service), and other services (e.g., conference calls, fax, CS data, or the like) and provides customer information when the customer is outside of the home network. The MSC/VLR 132 connects to an external network 140, such as a service switching point (SSP), via a CAP interface. The SSP is a telephone exchange to perform call processing. The SSP applies an SS7 protocol to control or manage call setup, call handling, and call termination with other SSPs.

The CS domain 130 also includes a home location register (HLR) 136. The HLR 136 is a database including details of each customer authorized to the CS domain 130. The MSC/VLR 132 communicates with the HLR 136 via a C, D, F, or H interface.

The CS domain 130 also includes a short message service center (SMSC) 134, which is responsible for the delivery of the short message texts. The MSC/VLR 132 communicates with the SMSC 134 via an E interface.

The BSC 106 also communicates with a serving GPRS support node (SGSN) 122 of a packet-switched (PS) domain 120 via a Gb interface. The SGSN 122 handles PS data, including mobility management and customer authentication. The SGSN 122 acts as the service access point for PS domain 120 and handles protocol conversion for internet protocol within the PS domain 120. The SGSN 122 communicates with a gateway GPRS support node (GGSN) 124 via a Gn interface. The GGSN 124 provides connectivity between the UE 102 and the external network 140, such as an external data packet network, including a public data network, an IP multimedia subsystem (IMS) core, the like, or combinations or multiples thereof. The GGSN 124 can be connected to the external network 140 via a Gi interface.

The SGSN 122 of the PS domain 120 can communicate with the SMSC 134 of the CS domain 130 via a Gd interface, with the MSC/VLR 132 of the CS domain 130 with a Gs interface, and with the HLR 136 of the CS domain 130 via a Gr or Gf interface. The GGSN 124 of the PS domain 120 can communication with the HLR 136 of the CS domain 130 via a Gc interface.

When the access network 104b is UTRAN, the network site 110b is a NodeB which is controlled by the radio network controller (RNC) 108. The NodeB includes equipment to transmit and receive radio signals, antennas, and equipment to encrypt and decrypt communications with the RNC 108. The RNC 108 can control multiple NodeBs. The RNC 108 controls radio resource management, some mobility management functions, and data encryption to and from the UE. The NodeB and the RNC 108 are in communication via an IuB interface.

The RNC 108 communicates with the SGSN 122 of the PS domain via an IuPS interface. The RNC 108 communicates with the MSC/VLR 132 of the CS domain 130 via an IuCS interface. The RNC 108 communicates with the SGW 116 of the data core 150 via a S12 interface.

Figure 2:
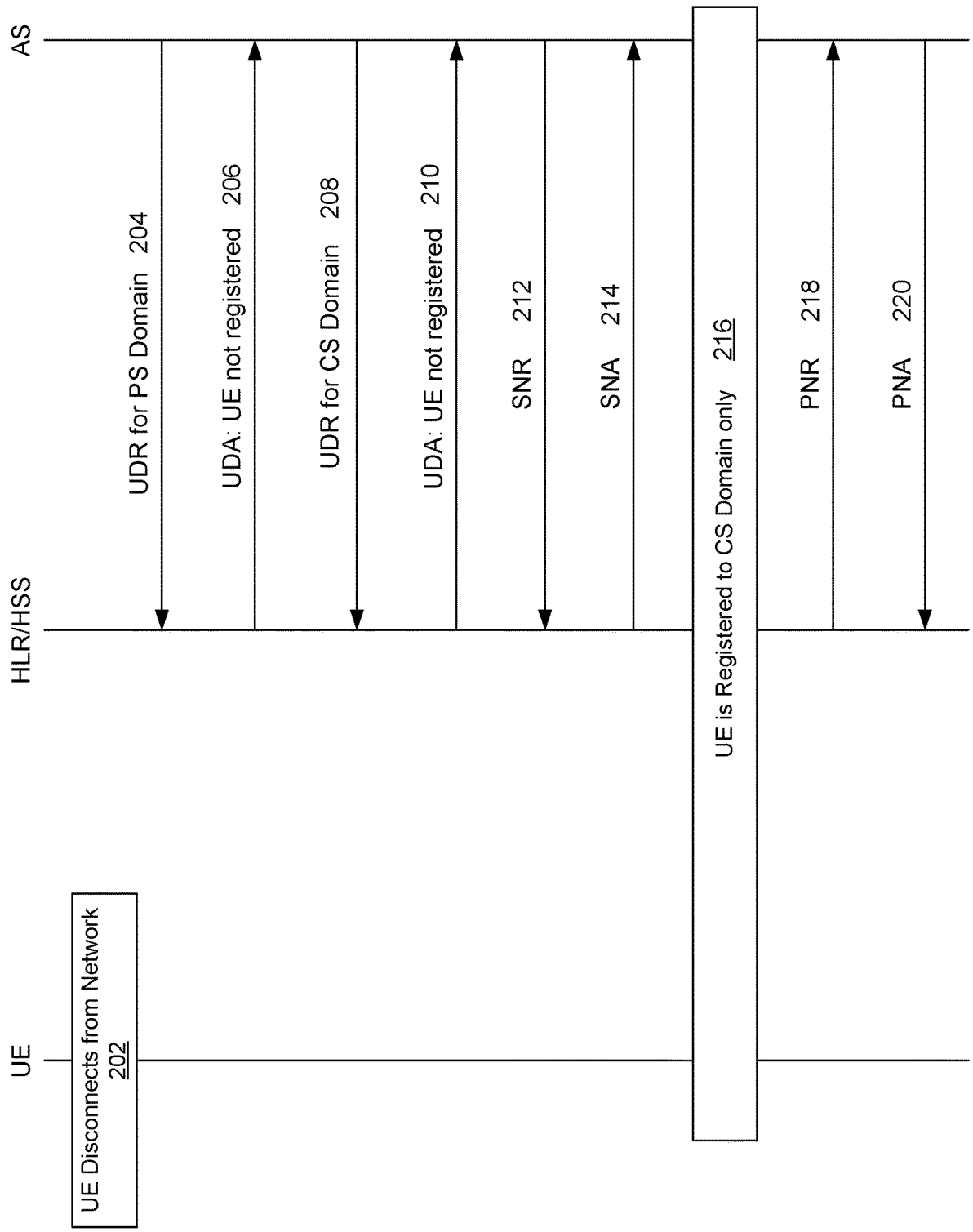
FIG. 2 illustrates a flowchart for an example process for determining domain registration.

FIG. 2 shows a flowchart for determining when the UE is registered only to the CS domain. The UE can be registered only to the CS domain based on a user preference, available network services based on UE location, or the like.

At 202, the UE disconnects from a telecommunications network. The UE may have disconnected due to the UE having been powered off, the UE having been disconnected from the network, the UE being out of range of a network site, or the like.

An application server (AS) generates user data requests (UDRs) to query the PS and CS domains to determine the domain, if any, to which the UE is registered (i.e., to determine which services are available to the UE). At 204, a first UDR causes the PS domain to be queried. At 206, the SGSN or MME, depending on which is queried, then returns a user data answer (UDA) that the UE is not registered with the PS domain. Or, alternatively, the SGSN or MME does not provide the UDA. Then, at 208, a second UDR causes the CS domain to be queried. At 210, the MSC/VLR then returns a UDA that the UE is not registered with the CS domain. Or, alternatively, the MSC/VLR does not provide the UDA. Therefore, the UE is determined not to be connected to either domain of the network, whether due to the UE being powered off, the UE being disconnected from the network, or the like.

Each UDR includes attribute value pairs (AVPs) to query a node of the domain. Each AVP includes an attribute and a value. The value is data or information. The attribute is the field represented by the value. The AVP includes a domain attribute and a node attribute. The domain values can include "1" (for PS domain), "0" (for CS domain), or the values can be imported from a list of another attribute. The node values can include "1" (for SGSN), "0" (for MME), "0,1" or "1,0"

(for both SGSN and MME in the respective order) values, a "MSC/VLR" value, or the values can be imported from a list of another attribute.

Because the UE is disconnected from the network, the PS and CS domains respond with user data answers (UDAs) that the UE is not registered with the respective domain. Alternatively, rather than responding in the negative (i.e., "UE is not registered," "Negative," or the like), the PS and CS domains do not provide any responses, such that after a given amount of time, the AS determines that the UE is not registered with either domain, and is therefore disconnected from the network.

After determining that the UE is not connected to the network, at 212, the AS generates a subscribe-notifications-request (SNR). The SNR is transmitted to the HSS which communicates the SNR internally to the HLR. The SNR includes a first AVP to generate a notification that the UE is registered with the CS domain without requiring initial registration with a PS domain (e.g., SMSRegistrationInfo AVP is "IP-SM-GW" or "Short Message Service Center" address). The SNR can also include a second AVP to generate a notification that the UE is registered to the PS domain (e.g., UE Reachability for IP). The SNR thereby requests a change in user data when the UE registers only with the CS domain. At 214, the HSS, HLR, or both respond with a subscribe-notifications-answer (SNA) to acknowledge receipt and acceptance of the respective SNRs.

At 216, the UE then reconnects to the network. When the UE registers with the CS domain, the HLR generates a CS domain registration notification in response to the SNR based on the SMSRegistrationInfo AVP. The HLR then transmits the CS domain registration notification to the HSS. The HSS also determines if the UE is registered with the PS domain. To do so, the HSS can request user data from the SGSN or MME. When the UE is not connected to the PS domain, the response from the HSS request can be in the negative or not provided.

When the UE is registered only to the CS domain (i.e., "IP-SM-GW" is false, "Short Message Service Center" is true, and UE Reachability for IP is false or no notification is generated or received), the HSS, at 218, generates a push-notification-request (PNR) based on the SNR and the UE only being registered to the CS domain. The PNR is a notification of the change in user data (i.e., the UE is registered only to the CS domain). The PNR is transmitted to the AS. Voice and legacy message services are then available to the UE because the UE is only registered to the CS domain.

At 220, the AS transmits a push-notification-answer (PNA) to the HSS to acknowledge receipt of the PNR.

Embodiments of the invention can include a non-transitory computer readable medium which can store instructions for performing the above-described methods and any steps thereof, including any combinations of the same. For example, the non-transitory computer readable medium can store instructions for execution by one or more processors or similar devices.

Further embodiments of the present invention can also include the one or more user equipment(s), network sites, backend network, or servers which read out and execute computer executable instructions, such as a non-transitory computer-readable medium, recorded or stored on a storage medium (which may be the same as or different than the storage medium for storing images or files, as discussed above), to perform the functions of any embodiment. The user equipment or server may include one or more of a central processing unit (CPU), micro processing unit (MPU), or other circuitry, such as a processor, and may include a network of separate user equipment or servers or separate computer processors. The computer executable instructions may be provided to the user equipment, network node, or server, for example, from a network or the storage medium.

Though certain elements, aspects, components or the like are described in relation to one embodiment or example of a telecommunications network, those elements, aspects, components or the like can be including with any other telecommunications network, such as when it desirous or advantageous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A system for detecting domain registration, comprising:
   a processor configured to:
   transmit a request to a node comprising an attribute value pair (AVP) comprising a first value and a second value,
   receive a notification from the node that a user equipment (UE) is reconnected to a network and re-registered only to a circuit-switched (CS) domain of the network, and
   transmit an instruction to provide a circuit-switched service to the UE; and
   an output configured to output the notification that the UE is re-registered to the CS domain,
   wherein the notification is based on a response to the request, the response indicating that the first value of the AVP is false and the second value of the AVP is true.

2. The system of claim 1, wherein the first value is associated with a public-switched (PS) domain and the second value is associated with the CS domain.

3. The system of claim 1, wherein the node is a home subscriber server (HSS).

4. The system of claim 1, wherein the notification is a push-notification-request (PNR).

5. The system of claim 1, wherein the processor is further configured to transmit a subscribe-notifications-request (SNR) to the node to cause the notification to be generated automatically.

6. The system of claim 5, wherein the processor is further configured to query a CS domain node and to query a PS domain node.

7. The system of claim 6, wherein the processor is further configured to receive responses from the CS domain node query and the PS domain node query.

8. The system of claim 7, wherein the SNR is generated based on negative responses, not provided responses, or both.

9. The system of claim 6, wherein the CS domain node is a mobile switching center/visitor location register (MSC/VLR) or a home location register (HLR).

10. The system of claim 6, wherein the PS domain node is a serving GPRS support node (SGSN), a mobility management entity (MME), or both.

11. The system of claim 1, wherein the circuit-switched service is a voice service, legacy messaging, or both.

12. A method for detecting domain registration, comprising:
   transmitting a request to a node, the request comprising an attribute value pair (AVP) comprising a first value and a second value;
   receiving a notification from the node that a user equipment (UE) is reconnected to a network and re-registered only to a circuit-switched (CS) domain of the network;
   transmitting an instruction to provide a circuit-switched service to the UE; and
   outputting the notification that the UE is re-registered to the CS domain,
   wherein the notification is based on a response to the request, the response indicating that the first value of the AVP is false and the second value of the AVP is true.

13. The method of claim 12, wherein the first value is associated with a public-switched (PS) domain and the second value is associated with the CS domain.

14. The method of claim 12, wherein the notification is a push-notification-request (PNR).

15. The method of claim 12, further comprising generating a subscribe-notifications-request (SNR) to cause the notification to be generated automatically.

16. The method of claim 15, further comprising querying a CS domain node and a PS domain node.

17. The method of claim 16, wherein the SNR is generated based on negative responses, not provided responses, or both.

18. The method of claim 16, wherein the CS domain node is a mobile switching center/visitor location register (MSC/VLR) or a home location register (HLR), and wherein the PS domain node is a serving GPRS support node (SGSN), a mobility management entity (MME), or both.

19. The method of claim 12, further comprising providing a voice service, legacy messaging, or both to the UE.

20. The method of claim 12, wherein the node is a home subscriber server (HSS).

* * * * *